UNITED STATES PATENT OFFICE.

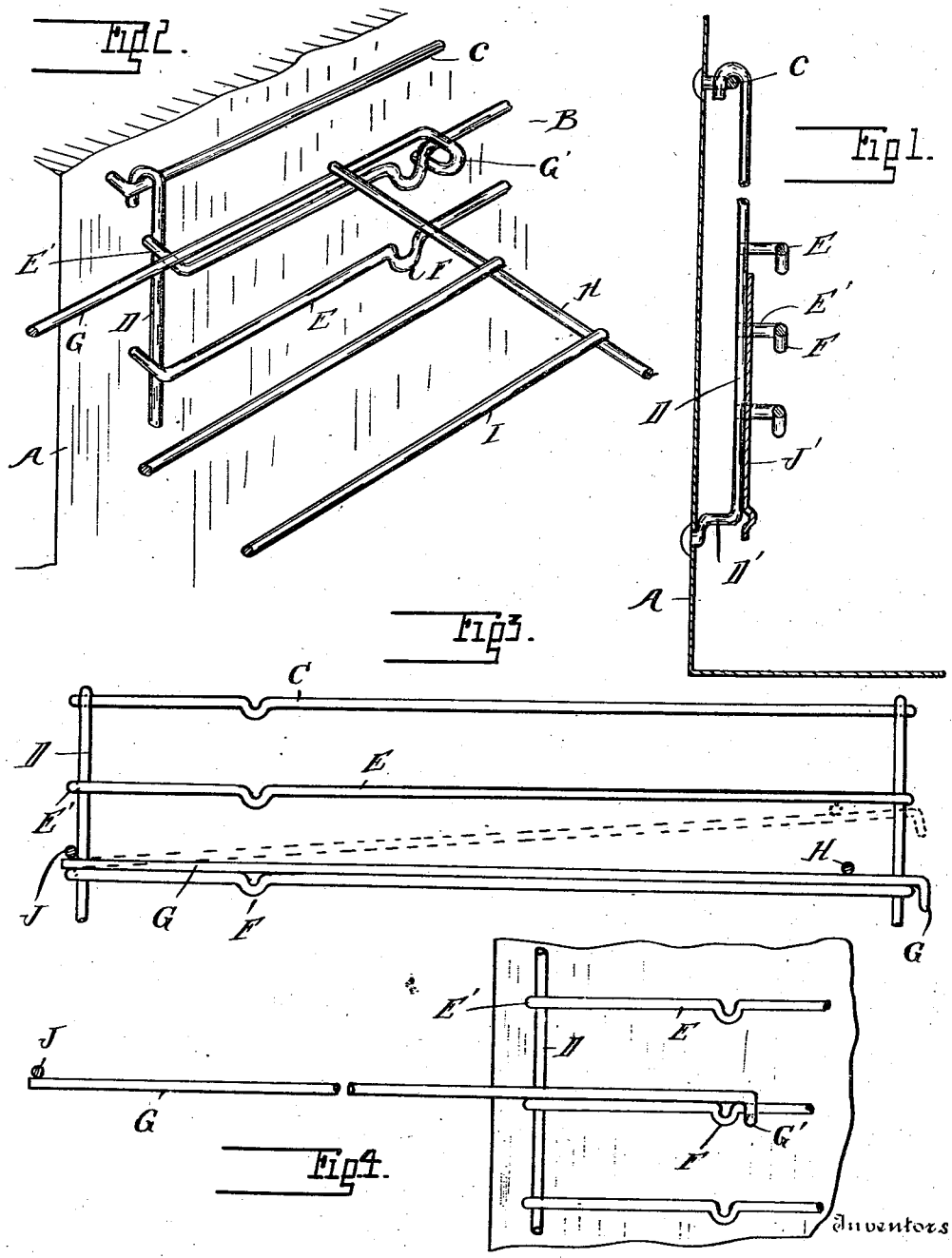

FRANK KUHN AND FRANK E. SHAILOR, OF DETROIT, MICHIGAN, ASSIGNORS TO AMERICAN ELECTRICAL HEATER COMPANY, OF DETROIT, MICHIGAN, A CORPORATION OF MICHIGAN.

OVEN.

1,191,198.  Specification of Letters Patent.  Patented July 18, 1916.

Application filed May 8, 1915. Serial No. 26,791.

*To all whom it may concern:*

Be it known that we, FRANK KUHN and FRANK E. SHAILOR, both citizens of the United States of America, residing at Detroit, in the county of Wayne and State of Michigan, have invented certain new and useful Improvements in Ovens, of which the following is a specification, reference being had therein to the accompanying drawings.

The invention relates to oven construction, and has more particular reference to the adjustable racks or shelves and the means for engaging the same with the oven casing.

In the drawings: Figure 1 is a vertical section through a portion of an oven showing one of the side rack-supporting frames; Fig. 2 is a perspective view of said frame showing a rack in engagement therewith and drawn outward from the oven; Fig. 3 is a side elevation illustrating the manner of disengaging the rack from the frame; and Fig. 4 is a similar view showing the rack drawn outward as in Fig. 2.

It is usual in oven construction to provide adjustable racks or shelves, which are engageable with guides at the sides of the oven so as to be moved inward and outward thereon. In use, these racks are generally drawn outward to facilitate the removal of a hot pan or other utensil which has been supported thereon, but care must be taken to avoid completely disengaging the rack from the guides. With our improved construction the racks are freely slidable upon their guides to be withdrawn a safe distance from the oven, but are positively stopped from complete disengagement. On the other hand, where it is desirable to disengage the rack from one of the guides this may be accomplished by a simple manipulation.

A is the side wall of the oven casing. B are rack guides thereon, preferably formed of wire and as specifically shown comprising a horizontally-extending top bar C having its ends turned inward and riveted to the oven side, vertical bars D at opposite ends of the bar C having hooked engagement therewith and having their lower ends turned inward at D' and riveted or otherwise secured to the oven side, and also horizontal bars E having their ends turned inward at E' and secured to the vertical bars D preferably by spot-welding. Each of the horizontal bars E is provided with a shoulder therein, preferably formed by U-shaped bend F and so located as to form a stop for limiting the outward movement of the rack. The rack or shelf is also preferably formed of wire rods, the end rods G being arranged to rest upon the inturned portions E' of the horizontal rods E, while at their inner ends these rods G are provided with U-shaped bends G' for embracing the rods E. In addition to the side bars G the racks are provided with cross bars H and intermediate bars I parallel to the bars G, also a front bar J, which when the rack is moved inward will strike against the vertical bars D of the guide to limit said inward movement.

With the construction as described in use, the rack G may be engaged with any one of the guides E by first placing it above said guide and moving inward until the ends of the front bar J strike against the vertical bars D. In this position the loops G' will extend beyond the inner ends of the guides E and will drop into registration with said guides, so that when the rack is again drawn outward said loops will embrace the guide. When thus engaged the rack may be drawn outward until the loop G' strikes against the shoulder formed by the U-shaped bend F, which will limit further outward movement. The adjustment is, however, sufficient to permit of moving any article which has been supported upon the rack, and the weight is sustained by the support of the bars G upon the inturned portions E' of the guides E, as well as by the engagement of the loops G' with said guides, and thus the rack is in perfectly stable position. To disengage the rack from the guide it is only necessary to adjust the same inward until the loop G' passes beyond the end of the guide, and by then tipping the inner end of the rack upward it may be completely withdrawn and engaged with any other one of the guides.

By mounting the guides E upon the vertical bars D, which are spaced from the side wall A of the oven, an unobstructed passage is left at the side for the ascending hot air in the oven chamber, which facilitates uniform distribution of the heat. If desired this air passage may be separated from the space inside of the guide by a sheet metal deflector J' which is secured to the guides by spot-welding or otherwise.

What we claim as our invention is:—

1. In an oven, the combination of a rack guide or support, comprising a horizontally-arranged wire bar having out-turned ends and a substantially U-shaped bend intermediate its ends forming a shoulder or stop, means for supporting said out-turned ends, and a rack having a side bar for resting upon one of said out-turned ends, the inner end of said side bar having a laterally inwardly extending loop or return-bend arranged to pass beyond the inner end of said guide when said rack is moved inward, and in the subsequent outward movement of said rack to pass over the angle-bent end of the guide and to embrace the intermediate portion thereof, said outward movement being limited by said stop.

2. In an oven, the combination of a rack guide or support formed of a wire rod having out-turned end portions engaging a support and an intermediate portion having a bend therein forming a stop, a rack provided with a side bar for resting upon one of the out-turned ends of said guide, said side bar being of greater length than said guide and having at its inner end a laterally-extending return-bent portion adapted to drop over the end of said guide and to embrace the same, in the subsequent outward movement said loop coöperating with the bend in said guide to form a stop for limiting the outward movement.

3. In an oven, a rack guide comprising a series of horizontal parallelly-arranged wire bars having out-turned angle bent portions, a support for said out-turned portions U-shaped, bends in said bars intermediate their ends forming integral stops, and a rack adapted to be supported on the out-turned portions of said horizontal bars and having at its inner end a portion engageable with and disengageable from said horizontal bars when in its innermost position of adjustment.

4. In an oven, a rack guide comprising a series of parallelly-arranged horizontal wire bars each having a substantially U-shaped bend therein to form a stop intermediate its ends and provided at its ends with out-turned portions, vertical bars to which said out-turned end portions are secured, and a rack having side bars for resting upon the out-turned portions of any one of said horizontal bars, said side bar having at its inner end a loop movable into registration with said horizontal bar when said rack is adjusted inward and limited by said stop when the rack is adjusted outward.

In testimony whereof we affix our signatures in presence of two witnesses.

FRANK KUHN.
FRANK E. SHAILOR.

Witnesses:
ROLAND DRESSEL,
ARCHIE E. PALMER.